(12) United States Patent
Kolar et al.

(10) Patent No.: US 11,811,644 B2
(45) Date of Patent: Nov. 7, 2023

(54) DISTRIBUTED PREDICTIVE ROUTING USING LIGHTWEIGHT STATE TRACKING

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 17/548,985

(22) Filed: Dec. 13, 2021

(65) Prior Publication Data
US 2023/0188456 A1 Jun. 15, 2023

(51) Int. Cl.
*H04L 45/12* (2022.01)
*H04L 45/00* (2022.01)
*H04L 45/302* (2022.01)
*H04L 41/5009* (2022.01)
*H04L 45/02* (2022.01)

(52) U.S. Cl.
CPC .......... *H04L 45/08* (2013.01); *H04L 41/5009* (2013.01); *H04L 45/123* (2013.01); *H04L 45/14* (2013.01); *H04L 45/22* (2013.01); *H04L 45/302* (2013.01)

(58) Field of Classification Search
CPC ..... H04L 45/08; H04L 45/123; H04L 45/302; H04L 45/306; H04L 45/22; H04L 45/24; H04L 45/70; H04L 41/5009; H04L 41/5019; H04L 43/045; H04L 43/55; H04L 43/20
See application file for complete search history.

(56) References Cited

U.S. PATENT DOCUMENTS

| | | | |
|---|---|---|---|
| 9,483,338 B2 | 11/2016 | Bhalla et al. | |
| 9,774,522 B2 | 9/2017 | Vasseur et al. | |
| 10,666,500 B2 | 5/2020 | Singh et al. | |
| 2002/0145981 A1* | 10/2002 | Klinker | H04L 45/124 370/244 |
| 2016/0028616 A1* | 1/2016 | Vasseur | H04L 45/22 370/412 |
| 2017/0012848 A1* | 1/2017 | Zhao | H04L 43/04 |
| 2019/0268240 A1* | 8/2019 | Yadav | H04L 43/08 |
| 2021/0165708 A1 | 6/2021 | Vijayaraghavan et al. | |
| 2021/0303381 A1 | 9/2021 | Baldassarre et al. | |

* cited by examiner

*Primary Examiner* — Mohamed A Kamara
(74) *Attorney, Agent, or Firm* — BEHMKE INNOVATION GROUP LLC; Kenneth J. Heywood; Jonathon P. Western

(57) ABSTRACT

In one embodiment, a device computes states of a network path associated with an online application by representing time series of telemetry data regarding the network path as discrete values. The device generates state trajectories from the states of the network path computed by the device. The device selects one or more sub-sequences of the state trajectories based on prediction performance metrics that represent how well the one or more sub-sequences are able to predict a failure condition of the network path. The device causes a networking entity to use the one or more sub-sequences of the state trajectories to perform predictive routing for the network path.

20 Claims, 11 Drawing Sheets

DISTRIBUTED PREDICTIVE ROUTING USING LIGHTWEIGHT STATE TRACKING

TECHNICAL FIELD

The present disclosure relates generally to computer networks, and, more particularly, to distributed predictive routing using lightweight state tracking.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, collecting and reporting the telemetry needed to support such predictions in the cloud can consume considerable resources addition, a closed loop system that relies on failure predictions in this manner can take a non-negligible amount of time to enact corrective measures, such as triggering a reroute of the network traffic. In many instances, this means that the user experience could remain degraded for upwards of an hour or even more. A potential alternative to this would be a distributed approach where the predictions are made on the local routers in the network, as opposed to in the cloud. However, network routers typically do not have the computing resources needed to perform complex predictions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
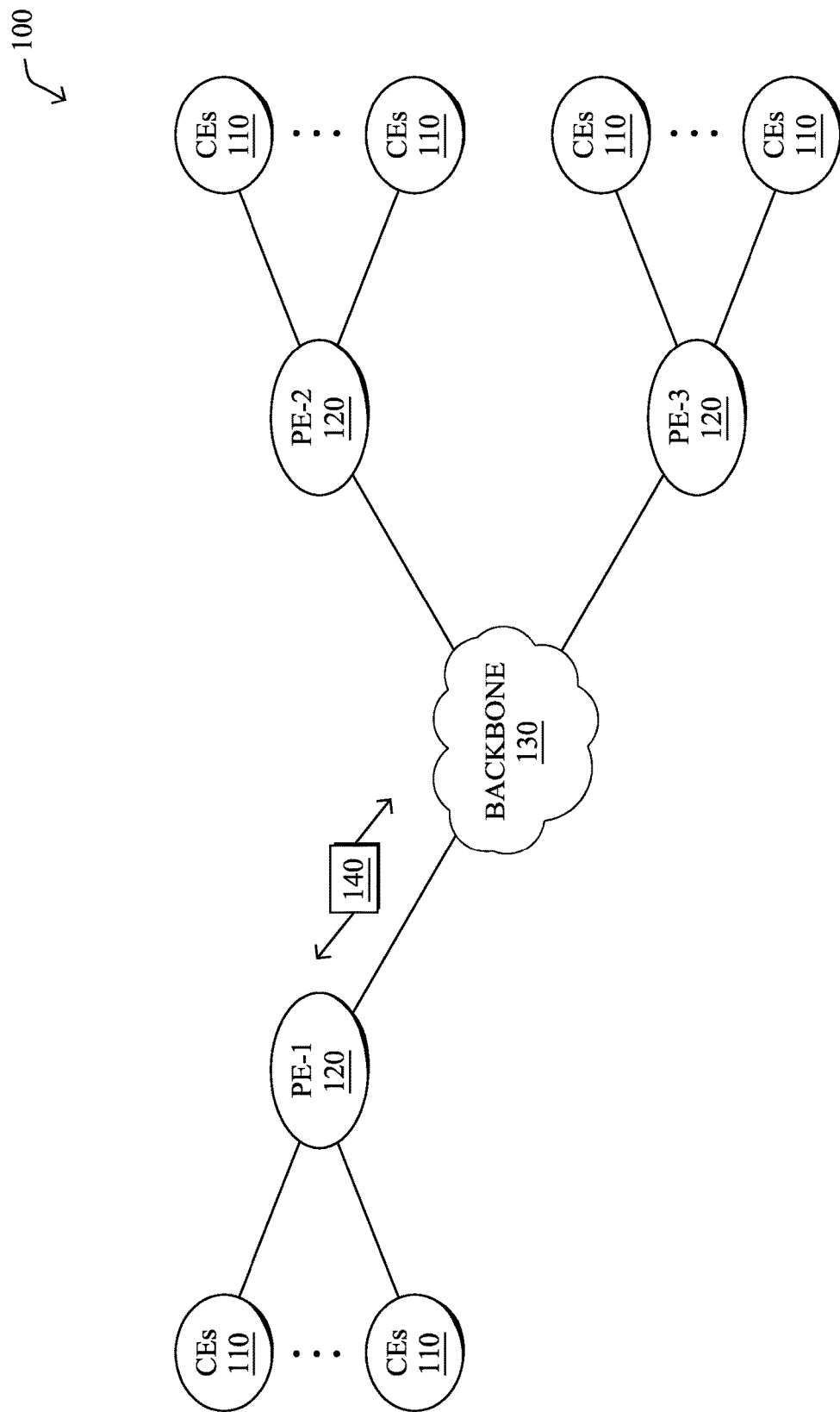
FIGS. 1A-1B illustrate an example communication network.

According to one or more embodiments of the disclosure, a device computes states of a network path associated with an online application by representing time series of telemetry data regarding the network path as discrete values. The device generates state trajectories from the states of the network path computed by the device. The device selects one or more sub-sequences of the state trajectories based on prediction performance metrics that represent how well the one or more sub-sequences are able to predict a failure condition of the network path. The device causes a networking entity to use the one or more sub-sequences of the state trajectories to perform predictive routing for the network path.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
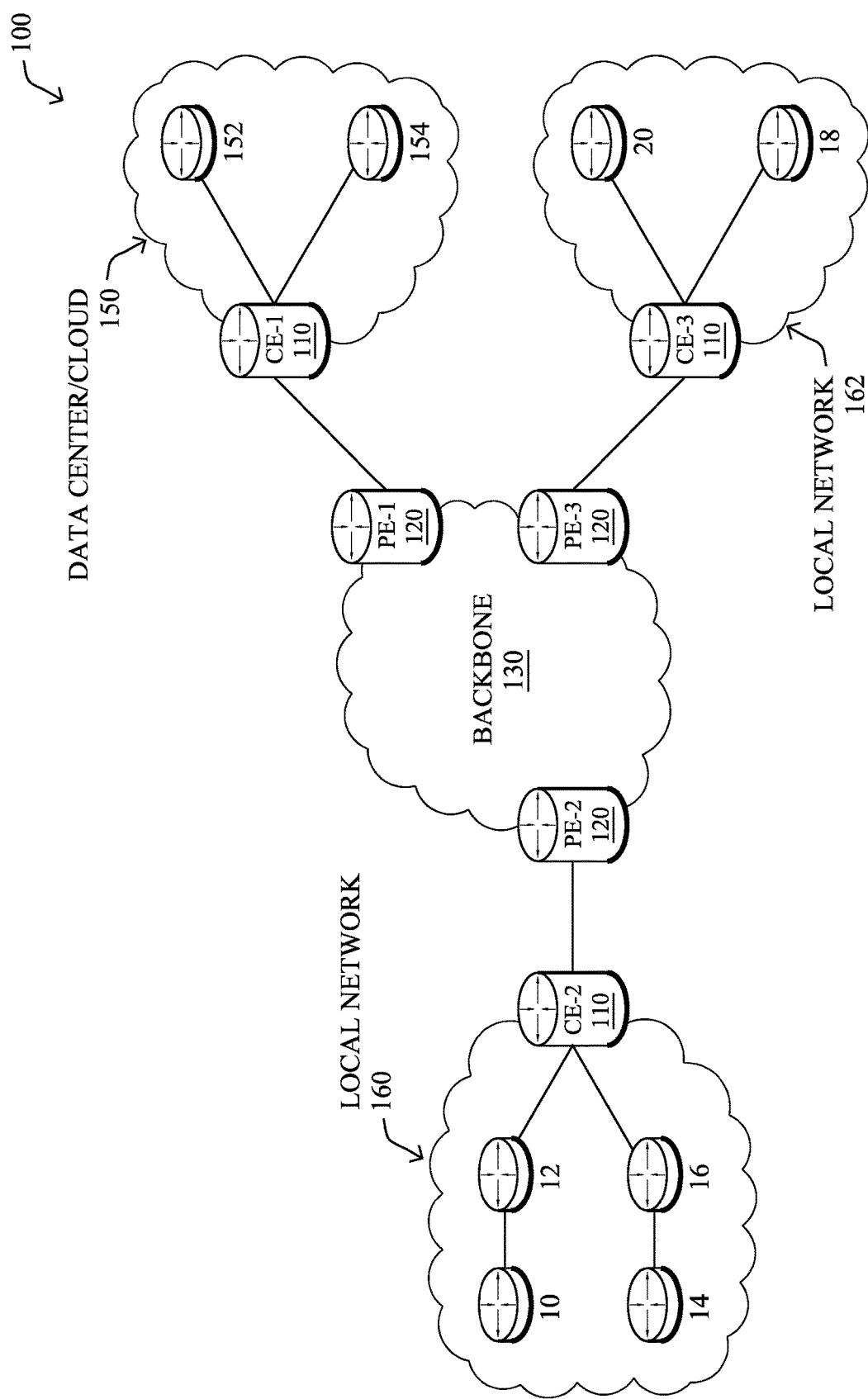

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
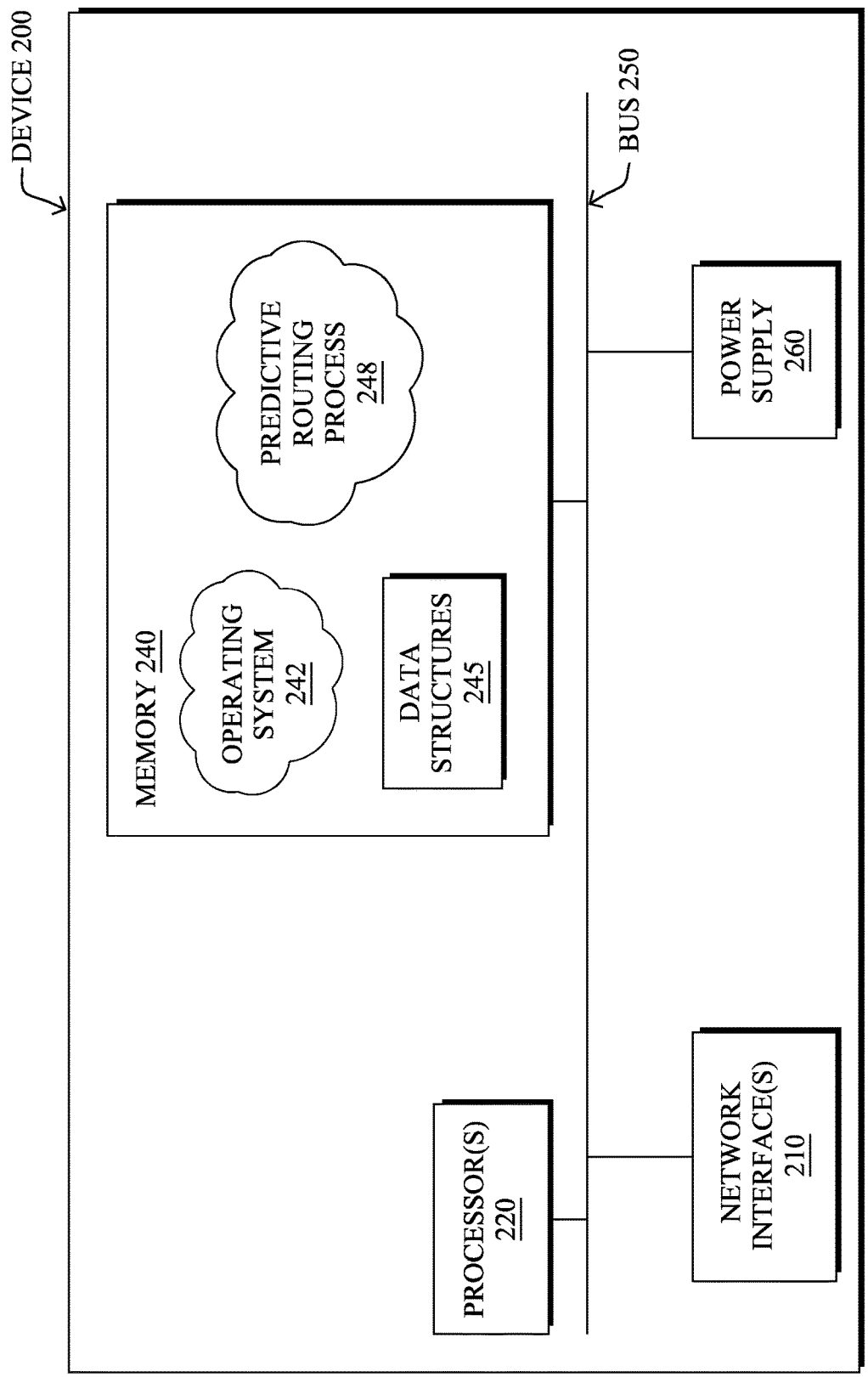
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
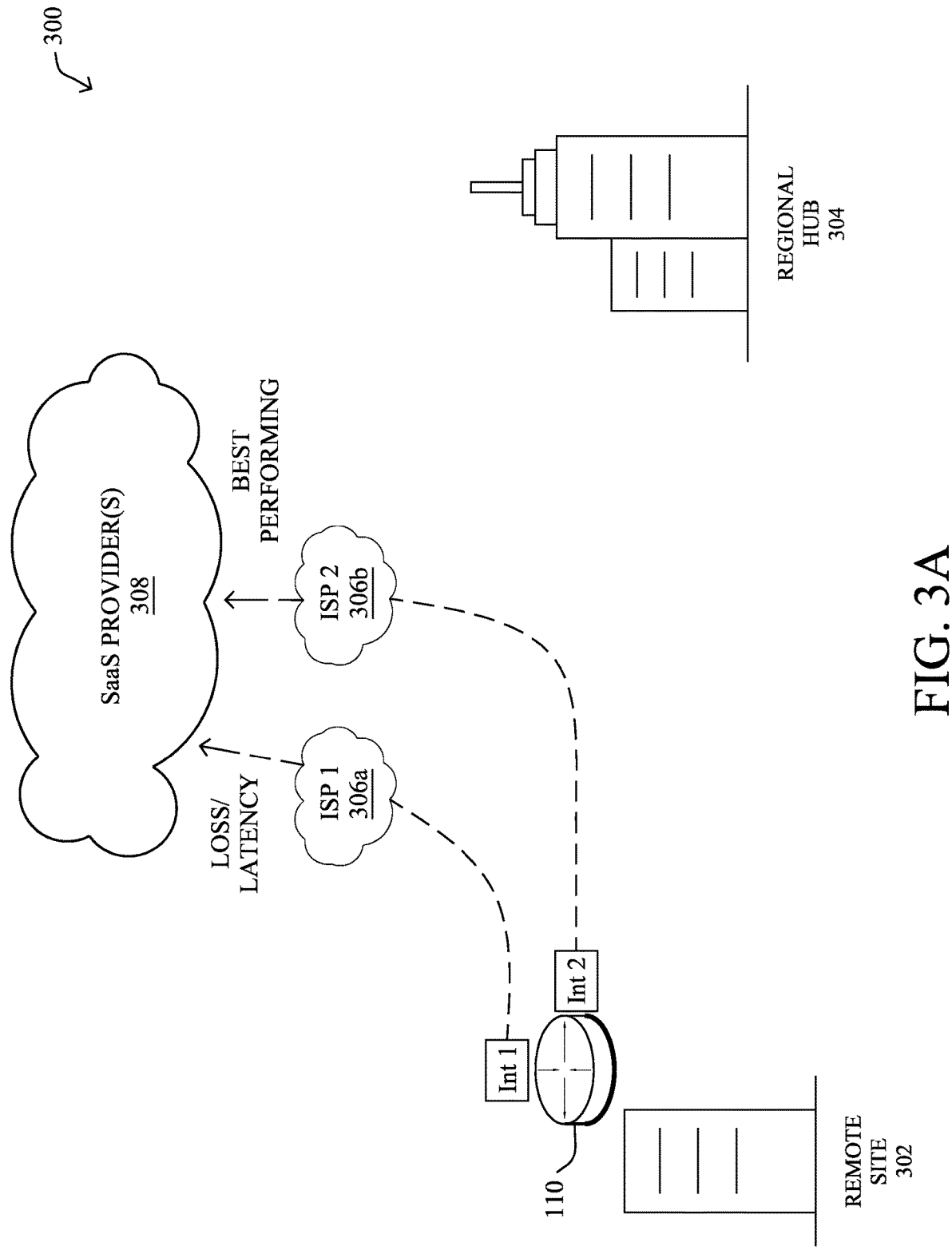
FIGS. 3A-3B illustrate example network deployments.
Figure 3B:
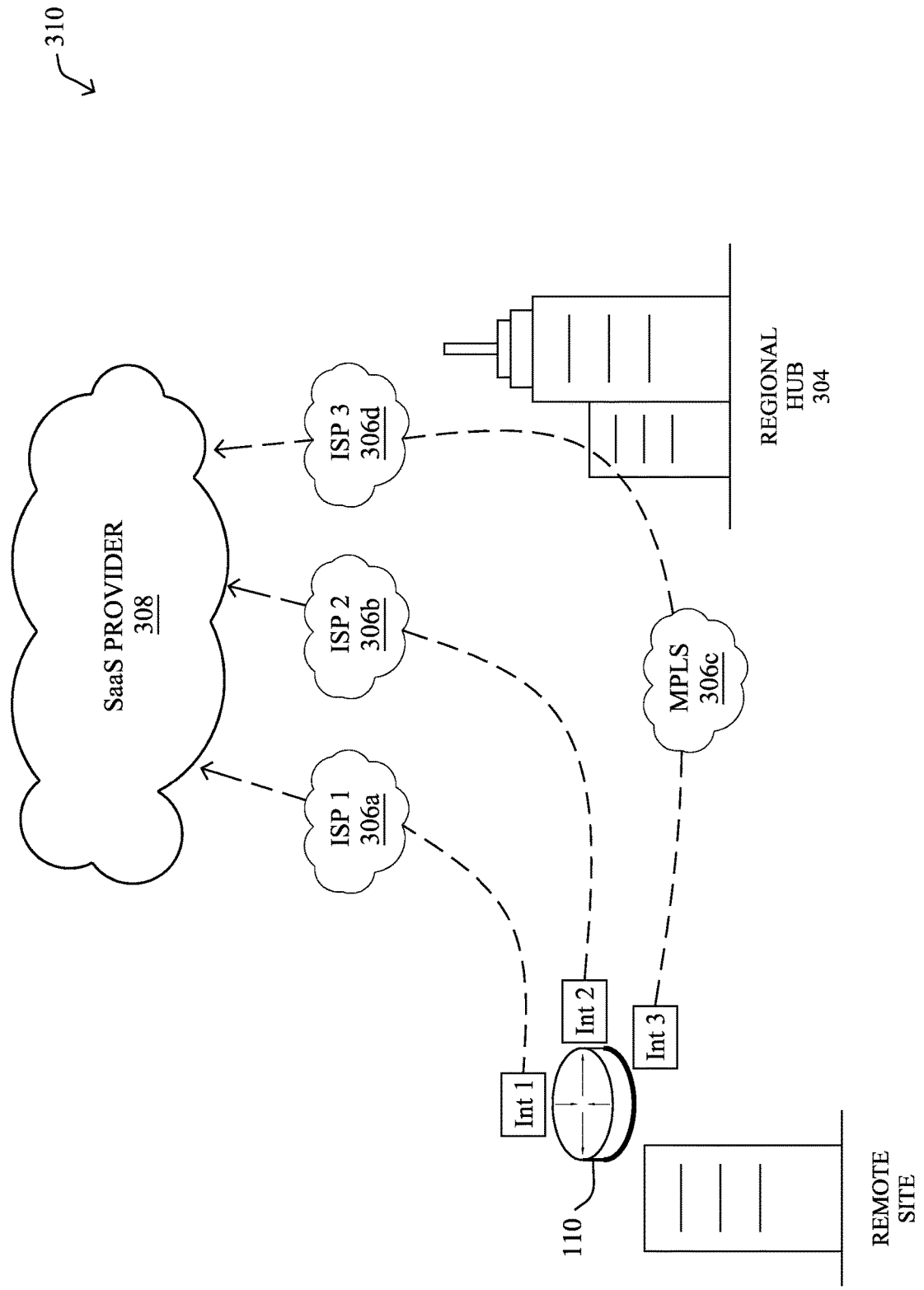

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
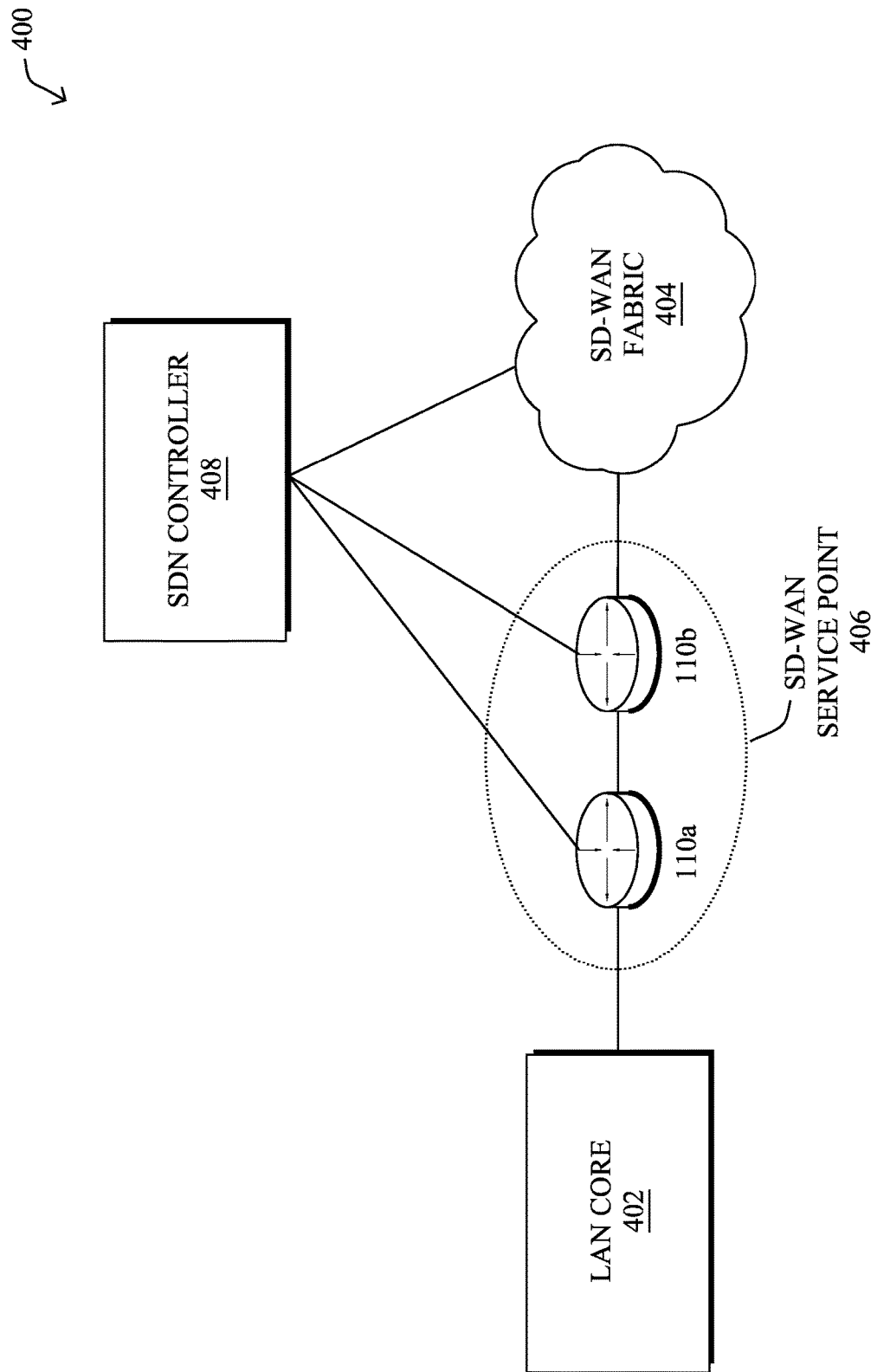
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc,), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast pith the notion of an informed decision, SLA failures are very common in the Internet and a good proportion of them could be avoided (e.g., using an alternate path), if predicted in advance.

Figure 4B:
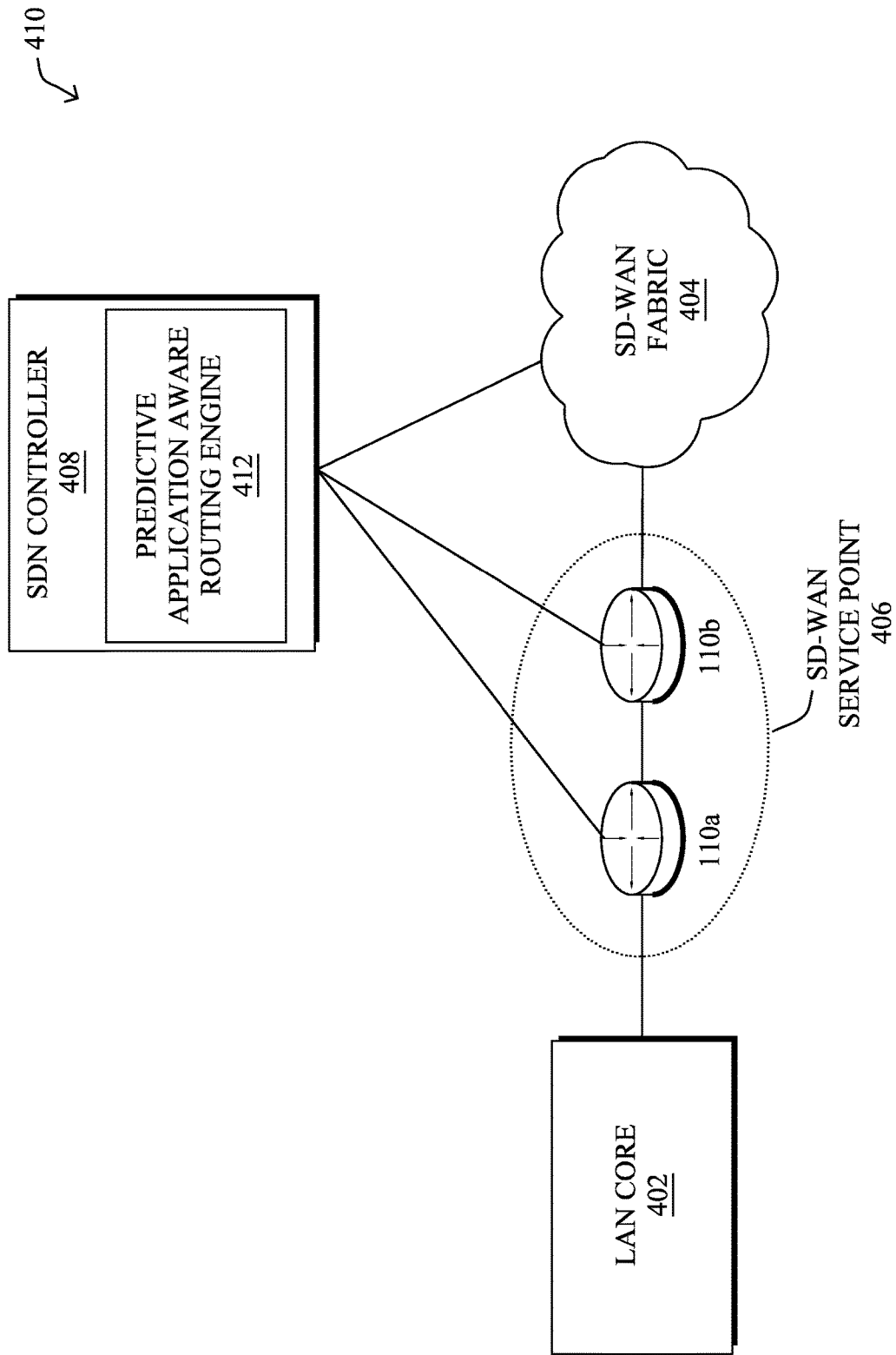

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, application-driven, predictive routing systems, such as predictive application aware routing engine 412, allow for the prediction of SLA violations and application experience degradations along a path, in order to proactively reroute traffic along a preferable path, thus leading to improving application quality of experience. In such cloud-based predictive routing solutions, a large amount of telemetry is gathered in the cloud (path characteristics in terms of latency, loss and jitter, application experience feedback provided by SaaS application providers, etc.), signal processing is performed on such telemetry, and stored in a data lake fed with a variety of potential disparate sources of information. Then, various algorithms are used so as to predict potential SLA failures and trigger proactive rerouting in the network.

One of core challenges in a cloud-based approach to predictive routing relates to the timing of the forecasts: indeed, algorithm inference takes place in the cloud (prediction of SLA violation on a set of paths), which is contingent on the telemetry first being sent to the cloud, processed in the cloud to make an inference (e.g., the predictions of an SLA violation), then followed by a closed-loop control mechanism that pushed a routing configuration change to the edge router (e.g., by having SDN controller 408 send the updated configuration to routers 110a-110b. With existing systems, it has been found that the time required for such a cycle to complete is roughly one hour, or more, and cannot be compressed. In many cases, there are also no early warning signs of a path failure more than one hour in advance, thus drastically limiting the ability of the system to predict and avert path failures. Consequently, application experience for users whose traffic traverses the problematic path may be degraded in the meantime.

Another challenge with respect to cloud-based solutions relates to the overhead in reporting all of the necessary telemetry to the cloud, which runs the risk of overloading the WAN links. Indeed, the volume of telemetry traffic may be very significant, leading to the use of high aggregation schemas leading to a loss of efficacy in predicting SLA violations.

On-prem solutions represent a potential alternative to cloud-based solutions, where the predictive model is still trained in the cloud, thus allowing for a reduction in the network resources required, as well as the amount of time needed to initiate corrective measures. Unfortunately, though, networking entities (e.g., routers, switches, etc.) do not have the computational resources of the cloud, limiting their abilities to execute complex prediction algorithms (e.g., LSTMs, etc.).

——Distributed Predictive Routing Using Lightweight State Tracking——The techniques introduced herein allow for distributed predictive routing by implementing State Transition Learning (STL) on premise, thus allowing for much shorter forecasting horizons and higher accuracy, at a high scale. In some aspects, the system may allow a user to select their online applications and path of interest according to the predictive power of the STL algorithm and/or the amount of traffic carried out along those paths (and provided by the system). In further aspects, a dynamic mechanism may be used to repeatedly adapt the size of sub-sequences and number of states tracked in the past, allowing the router or other networking entity to send events and network variables tracked in log pre- and post-failures, so as to dynamically adapt the number of sub-sequences according to their predictive power. In another aspect, the sub-sequences of states used by STL on each networking entity may be dynamically adjusted, according to the amount of resources available on the router in terms of CPU and memory.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device computes states of a network path associated with an online application by representing time series of telemetry data regarding the network path as discrete values. The device generates state trajectories from the states of the network path computed by the device. The device selects one or more sub-sequences of the state trajectories based on prediction performance metrics that represent how well the one or more sub-sequences are able to predict a failure condition of the network path. The device causes a networking entity to use the one or more sub-sequences of the state trajectories to perform predictive routing for the network path.

Figure 5:
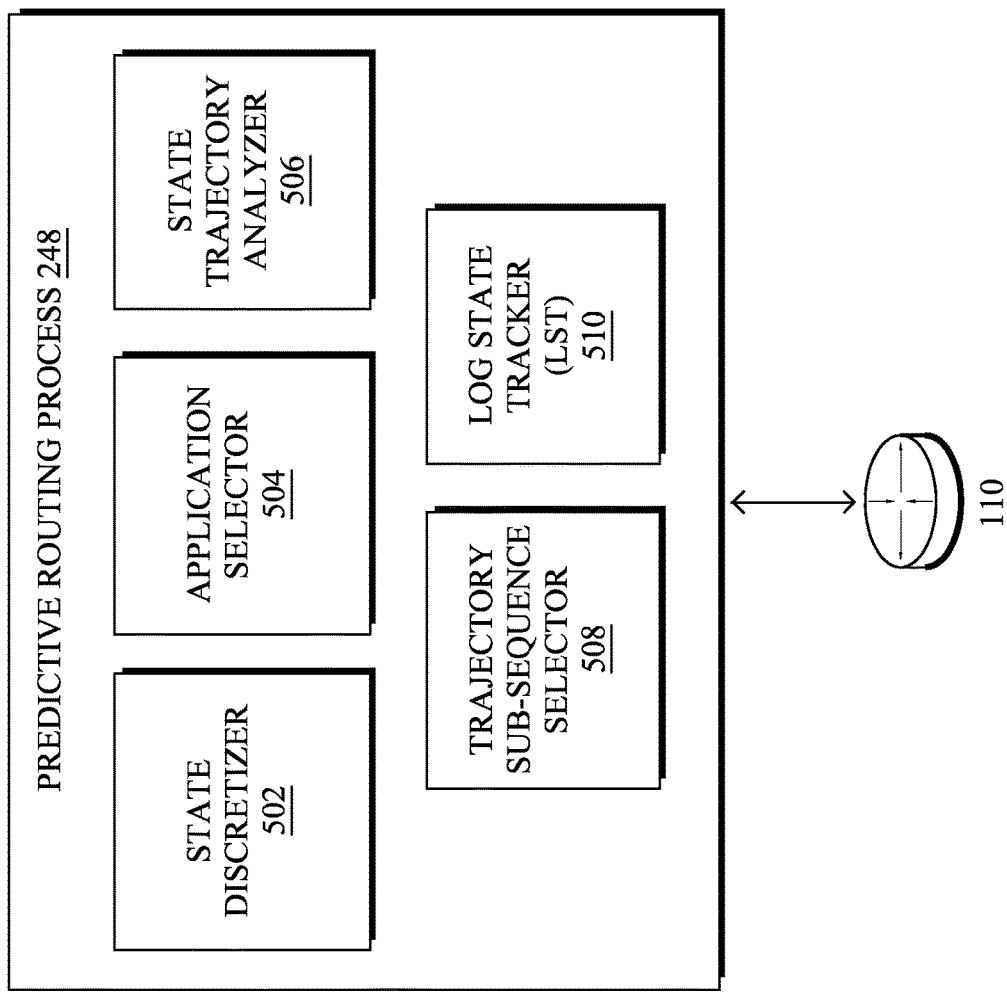
FIG. 5 illustrates an example architecture for distributed predictive routing using lightweight state tracking.

Operationally, FIG. 5 illustrates an example architecture 500 for distributed predictive routing using lightweight state tracking, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412.

As shown, predictive routing process 248 may include any or all of the following components: a state discretizer 502, an application selector 504, a state trajectory analyzer 506, a trajectory sub-sequence selector 508, and/or a log state tracker (LST) 510. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

During operation, state discretizer 502 may obtain various telemetry data regarding the network path(s) under scrutiny by predictive routing process 248. For instance, such telemetry data may take the form of path metrics (e.g., delay, jitter, packet loss, throughput, etc.), NetFlow records, application data (e.g., traffic load, destination, etc.), or the like. For instance, in the case of actual QoE metrics being available, state discretizer 502 may receive them from a provider of an online application. In other instances, state discretizer 502 may use SLA violations as a proxy for the QoE.

According to various embodiments, state discretizer 502 may represent the various telemetry time series that it obtains using discrete values. For instance, state discretizer 502 may use the symbol set of {a, b, c, z} to represent the discrete categories of delay, jitter, packet loss, etc., where a=low, b=medium, c=high, and z=SLA violation along a path P at a time t. Doing so allows the state of any given network path to be represented as a vector of discrete values.

In various embodiments, predictive routing process 248 may also include application selector 504, which allows a user or other system to select the online application(s) of interest, such as via a user interface. To that end, application selector 504 may initiate a traffic sampling mechanism on the networking element, such as router 110 shown, which returns the resulting network records to application selector 504. Such information can also be combined with information from an application recognition mechanism in the network, such as Network Based Application Recognition (NBAR) by Cisco Systems, Inc. In turn, application selector 504 may communicate with a user interface, allowing a user to specify rules such as the following:

List of applications of interest: Webex, O365 Teams, Zoom, Oracle.
Volume of traffic must be >x Mbits/s, with at least Y unique users
Set of locations of explicit interest etc.

According to various embodiments, predictive routing process 248 may further include state trajectory analyzer 506. In one embodiment, state trajectory analyzer 506 may collect the sequence of states in the last k-number of timesteps from state discretizer 502 for any of the applications and/or paths indicated by application selector 504. For instance, state trajectory analyzer 506 may represent the state of a path P for application class A at time t as S(P, A, t)=<probSlaViolationState, latencyState, lossState, jitterState>, where each individual state is a symbol from the set of discrete values {a,b,c,z} above.

Note that the selected features/types of data used in the vectorized state representations can vary. For instance, in the above example, the path state may be a function of features: probability of SLA violation, loss, latency and jitter. However, other combinations of features could also be used, in other embodiments. In addition, further embodiments also provide for different sets of discrete values and the use of {a, b, c, z} (i.e., four possible states) herein is for exemplary purposes only.

In general, state trajectory analyzer 506 is operable to find a sequence of patterns of the states referred to as state-trajectories that can predict an SLA violation or other metric indicative of degraded application QoE. In one embodiment, state trajectory analyzer 506 may look at last k-timesteps of states [S(P, A, t−k), . . . , S(P, A, t−1)] and predict S'(P, A, t). This number of last states being examined (k) can also be configured by a user, in one embodiment.

State trajectory analyzer 506 can be implemented using any number of suitable data mining algorithms, like sequential pattern mining (e.g., PrefixSpan), which finds out the sub-sequence of states that are of interest. The algorithm will first input set of positive k-states, i.e., all sequences of states [S(P, A, t−k), . . . , S(P, A, t−1)] where S(P, A, t) is the start of an SLA violation (rising edge). In turn, it may output a sub-sequence/state-trajectory of [SA− . . . −SB− . . . SC] that are prominently found in the set of positive k-states. For example, the algorithm may output [aabc, aabc, accc] to have a support of 30% meaning that 30% of all rising edges had state [*, aabc, *, aabc, *, accc,*]. Said differently, the support is indicative of the predictive power of such as trajectory of states. Note that the support provides the "recall" metric for the sub-sequence, i.e., the fraction of rising edges which are detected by a sub-sequence.

State trajectory analyzer 506 may use the above step to detect the sub-sequences/state transition patterns that commonly occur when there is a rising edge (e.g., an SLA violation) since the input data is the subset for rising edges only. However, such a pattern might be common even when there are no rising edges. For example, the sub-sequence [aaaa,*, aaaa] might be common for times when there are rising edges and also during times when there are no rising edges. If such sub-sequences are pruned, any resulting predictions may lead to false positives, since such sub-sequences occur frequently. Accordingly, state trajectory analyzer 506 may also perform pruning of sub-sequences/patterns that result in false positives, in further embodiments.

In one embodiment, state trajectory analyzer 506 may rely on the following metrics to prune patterns susceptible to providing false positives:

For each sub-sequence S_i selected, we compute the number of rows in the entire dataset that match the sub-sequence.

Positive or Negative: Each row in the dataset also be tagged as a positive or negative depending on if there is a rising edge in the next 10 minutes. Based on the above two metrics State trajectory analyzer 506 can then use the above two metrics to compute any or all of the following model performance metrics:

True positives (TP) for a sub-sequence: Num rows in the entire dataset where the sequence was a part of last 6-states, and the next-state is a rising edges False positives (FP) for a sub-sequence: Num rows in the entire dataset where the sequence was present in the last 6-states, but the next state was not a rising edge Precision=TP/(TP+FP)

In various embodiments, state trajectory analyzer 506 may use the precision metric (and/or the other prediction performance metrics) to select what are referred to herein as the "prominent sub-sequences" (PS) that will finally be used to trigger a rising edge. In one embodiment, state trajectory analyzer 506 may only select those sub-sequences/patterns as PS that have a precision greater than a defined threshold, which may be set by default or by a user.

In other embodiments, instead of state trajectory analyzer 506 evaluating the full path state (e.g., <a, c, c, c>), it may decompose such a state into univariate states. For example, "lb", "da," and "jc" implies loss is in state "b," latency (delay) is in state "a," and jitter is in state "c."

Thus, each state trajectory identified by state trajectory analyzer 506 may have any or all of the following properties:
Recall
Precision
Forecasting-Horizon (Fh) where Fh indicates the time from the end of a sequence and the failure detection. Of course, when considering a sequence of states, each state has a corresponding precision and recall, which increases as one progresses along the trajectory.

Figure 6A:
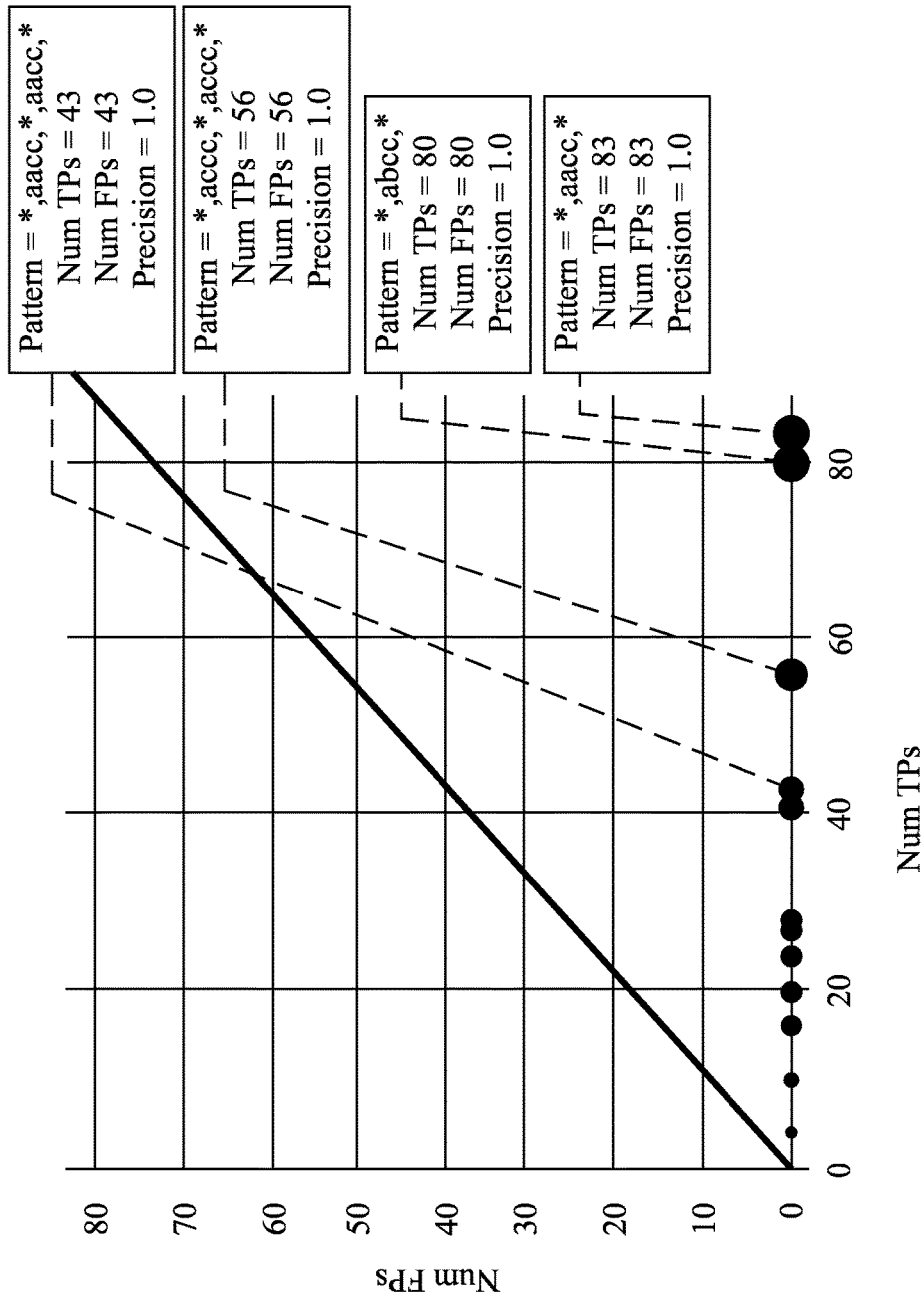
FIGS. 6A-6B illustrate example plots of prediction performance metrics for different.
Figure 6B:
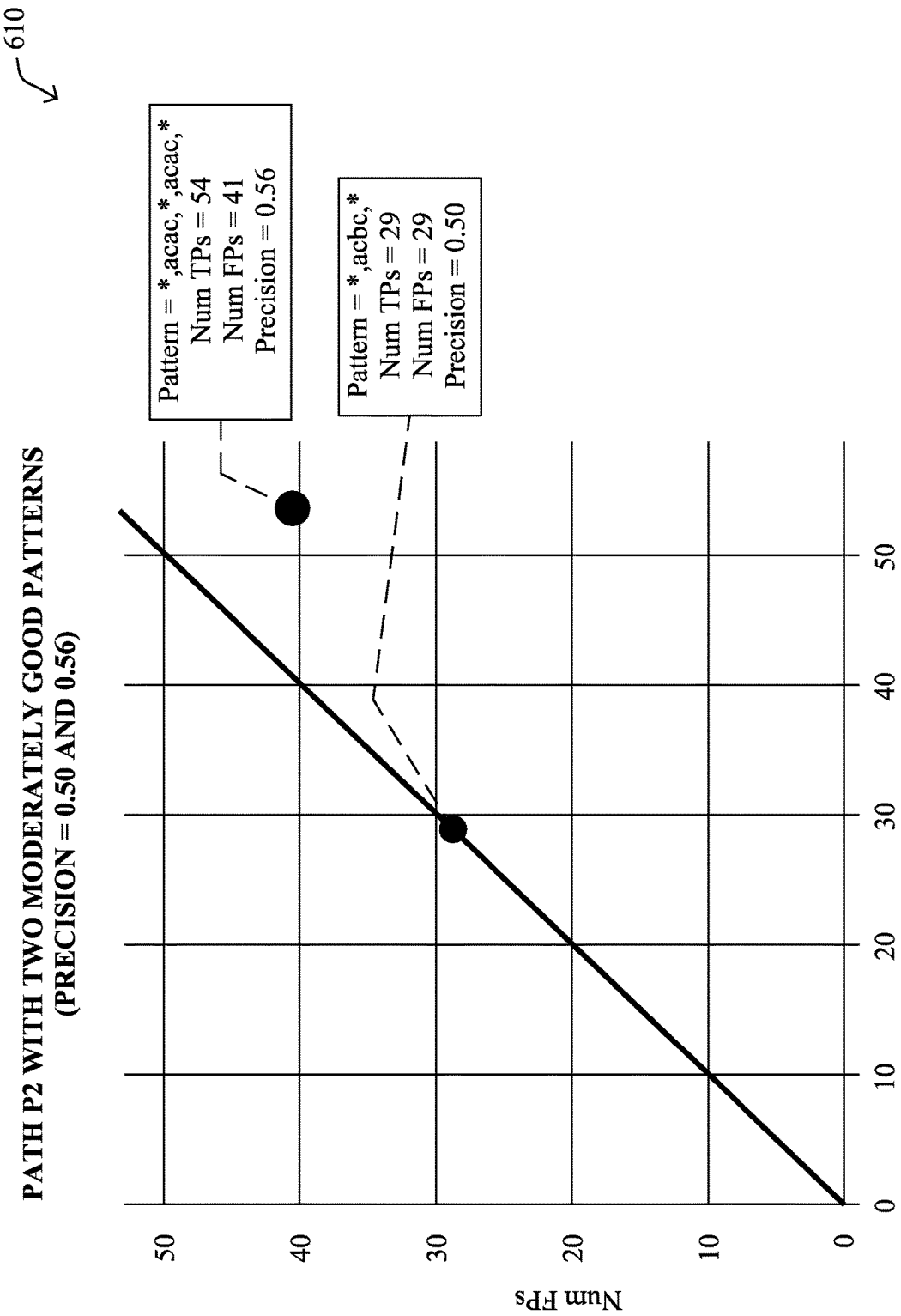

FIGS. 6A-6B illustrate example plots of prediction performance metrics for different, according to various embodiments. More specifically, plot 600 in FIG. 6A shows a plot of the number of false positives (FPs) vs. the number of true positives (TPs) for various prominent sub-sequence (PS)/patterns of a first path P1. Likewise, plot 610 in FIG. 6B shows a plot of the number of FPs vs. the number of TPs for various PS/patterns of a second path P2.

As can be seen in FIGS. 6A-6B, there may be multiple PS/patterns for a given path, each one having its own effectiveness. For example, Path P1 in FIG. 6A has approximately 12 patterns. All sub-sequence patterns detected are good and able to precisely detect rising edges. This can be seen since it detects varying number of rising edges, but with perfect precision (precision=1.0). However, the same is not true with Path P2 in FIG. 6B. Here, there are only two prominent sub-sequences, with each of them offering a precision of 0.5 or 0.56, respectively.

Each sub-sequence (dot) in FIGS. 6A-6B can also be tagged with the forecasting horizon (fh) in which the pattern is effective. For example, if a sub-sequence is always seen twenty minutes before the rising edge, it can be said to have forecasting horizon of at-least twenty minutes.

Referring again to FIG. 5, in some embodiments, state trajectory analyzer 506 may present information regarding the network paths that have interesting state sub-sequences/patterns, such as those in FIGS. 6A-6B, to a user interface for review by a user. In turn, the user may select those sub-sequences having high precision and discard those with low precision. The user may also choose to pick sub-sequences with high precision but also which detected at-least 'n' number of rising edges. Such graphs can be shown for different Forecasting horizon (Fh), as well. The user may also select a given horizon, and patterns only for such horizons can be shown. In other embodiments, the system may automatically compute certain Fh where the sub-sequence patterns are detected, and show such details to the user.

Additionally, state trajectory analyzer 506 may also present to the end user the traffic that would have been impacted by the failures that would have been predicted thanks to the respective sub-sequences. Indeed, although some sub-sequences allow for predicting a small number of failures with high precision, they may be on path where a significant amount of traffic is carried out. The system can infer the amount of traffic via different metrics such as number of session minutes when the path was in an SLA violation state or the number of bytes that were attempted to be sent during this stage. For example, in one embodiment, a graph similar to those in FIGS. 6A-6B can be shown where each pattern (dot) is highlighted by the amount of traffic (e.g., number of session minutes or bytes) that was saved when the pattern predicted a rising edge. The user can then select the pattern based on filtering out all patterns that have high precision, moderate recall, and high-traffic, for instance.

In various embodiments, predictive routing process 248 may also include trajectory sub-sequence selector 508, which is responsible for selecting a sub-sequence of states/ trajectories of interest, while taking into the resource constraints of the networking element that is to perform the predictive routing. Indeed, although a state-based prediction mechanism is lighter weight than costly machine learning algorithms (e.g., LSTMs, etc.), it still requires the networking element to track states for multiple variables with fine granularity of potentially a few seconds. Here, the objective is to predict with a small forecasting horizon, thus increasing the prediction accuracy and recall. As a reminder, by using a lightweight predicting engine on the networking element, such as router 110, this relaxes the hard constraint of having Fh>1 h as states above. Still, some networking elements may require more time to process telemetry (known as being CPU intensive) and update their routing information base (RIB)/forwarding information bases (FIB) (e.g., to proactively reroute traffic in advance of a predicted failure). A router or other networking element may then require Fh>Fh-min for a trajectory to be of interest. The networking element may then determine how frequently it can compute states for each networking and application variables and then potentially update its RIB/FIB. In turn, the networking element may then signal Fh back to trajectory sub-sequence selector 508.

Trajectory sub-sequence selector 508 may then select of all state trajectories of interest taking into account any or all of the following (user configurable) inputs:
List of applications of interest (as captured by application selector 504)
List of local constraints (Min Fh)
Note that not all networking elements in the network may be required to use the same set of sub-sequences, either, in some embodiments. For instance, low-end routers with limited resources may track a smaller number of trajectories than higher end routers.

For instance, as shown, trajectory sub-sequence selector 508 may send the sub-sequence(s) of states to router 110, causing it to use them for purposes of performing predictive routing for one or more network paths of router 110 and/or specific application(s). In turn, router 110 may use a lightweight, state tracking mechanism to identify when the behavior of the path matches the sub-sequence(s) and, in turn, reroute the application traffic. For example, say that the path states are vectorized as <probSLAviolation, loss, latency, jitter> (e.g., <z,b,c,z> represents an SLA violation, with medium loss, high latency, and an SLA violation by the jitter). Here, the 'hint' states/early signs may be those states with some (*b*) or (*c*), but no actual SLA violation, which can be used as 'hints' that a violation will soon occur, thus requiring corrective measures (e.g., rerouting).

Another potential component of predictive routing process 248 is log state tracker (LST) 510, which is responsible for proactively sending log files prior to any failures of interest observed on the router. To that end, LST 510 may send a message to router 110 indicating the list of "failures" of interest (e.g., link down, node reboot, memory leaks, . . . ). Upon detecting such an event, a circular buffer tracking all related events pre- and post-failure may be returned to LST 510. In turn, LST 510 may extract all continuous variable, which it can discretize, as well as all discrete events reported in the log, thus dynamically extending the number of events tracked by the STL algorithm. Doing so increases the size of the sub-sequences and potentially the number of states in the past. Such an approach allows for a dynamics selection of the input features (states) being used by the STL algorithm. New states may be added according to their observed predictive power by the algorithm, accordingly.

Another aspect of the techniques herein relates to a feedback loop with the networking entity, which may report the performance of its predictions back to predictive routing process 248. For instance, router 110 may report all false positives and false negatives to predictive routing process 248, during performance of its predictive routing functions. Since the inferences takes place on premise, router 110 issues all predictions and it is thus capable of tracking the occurrence of each FP and FN, with a fine timing granularity not supported by the usual telemetry engine. In doing so, this allows predictive routing process 248 to adjust the prediction performance metrics for the sub-sequences in use and potentially reconfiguring router 110 to use a different set for its predictions.

Figure 7:
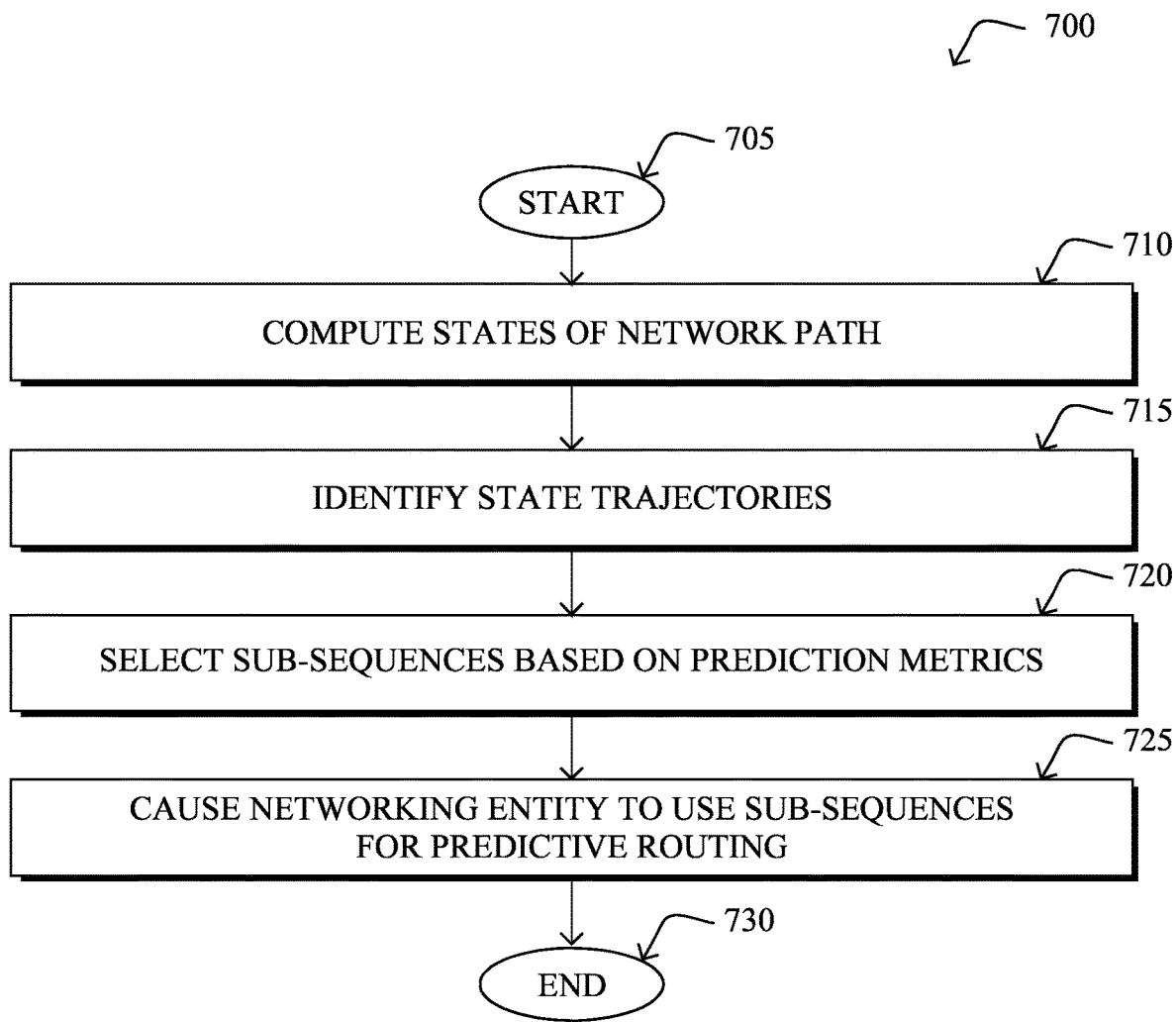
FIG. 7 illustrates an example simplified procedure for distributed predictive routing using lightweight state tracking.

FIG. 7 illustrates an example simplified procedure 700 (e.g., a method) for distributed predictive routing using lightweight state tracking, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 700 by executing stored instructions (e.g., predictive routing process 248). The procedure 700 may start at step 705, and continues to step 710, where, as described in greater detail above, the device may compute states of a network path associated with an online application by representing time series of telemetry data regarding the network path as discrete values. In some embodiments, the device may receive, via a user interface, an indication of the online application for which predictive routing should be enabled. In some embodiments, the telemetry data comprises at least one of: delay, loss, or jitter measurements for the network path. In another embodiment, the online application is a software-as-a-service (SaaS) application.

At step 715, as detailed above, the device may generate state trajectories from the states of the network path computed by the device. For instance, the device may generate sets of states that are observed over time for the network path.

At step 720, the device may select one or more sub-sequences of the state trajectories based on prediction performance metrics that represent how well the one or more sub-sequences are able to predict a failure condition of the network path, as described in greater detail above. In various embodiments, the failure condition of the network path comprises a service level agreement (SLA) violation or decrease in an application experience metric. In further embodiments, the prediction performance metrics comprise at least one of: a precision metric, a recall metric, a false positive metric, or a false negative metric. In one embodiment, the device selects the one or more sub-sequences of the state trajectories based in part on computational resources available at the networking entity.

At step 725, as detailed above, the device may cause a networking entity to use the one or more sub-sequences of the state trajectories to perform predictive routing for the network path. In various embodiments, the networking entity comprises a network router or switch. In some embodiments, the device may also receive, from the networking entity, an indication that a prediction made by the networking entity based on the one or more sub-sequences of the state trajectories was a false positive or false negative.

It should be noted that while certain steps within procedure 700 may be optional as described above, the steps shown in FIG. 7 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

While there have been shown and described illustrative embodiments that provide for distributed predictive routing using lightweight state tracking, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   computing, by a device, states of a network path associated with an online application by representing time series of telemetry data regarding the network path as discrete values;
   generating, by the device, state trajectories from the states of the network path computed by the device;
   selecting, by the device, one or more sub-sequences of the state trajectories based on prediction performance metrics that represent how well the one or more sub-sequences are able to predict a failure condition of the network path; and
   causing, by the device, a networking entity to use the one or more sub-sequences of the state trajectories to perform predictive routing for the network path.

2. The method as in claim 1, wherein the failure condition of the network path comprises a service level agreement (SLA) violation or decrease in an application experience metric.

3. The method as in claim 1, wherein the networking entity comprises a network router or switch.

4. The method as in claim 1, wherein the prediction performance metrics comprise at least one of: a precision metric, a recall metric, a false positive metric, or a false negative metric.

5. The method as in claim 1, wherein the device selects the one or more sub-sequences of the state trajectories based in part on computational resources available at the networking entity.

6. The method as in claim 1, further comprising:
   receiving, from the networking entity, an indication that a prediction made by the networking entity based on the one or more sub-sequences of the state trajectories was a false positive or false negative.

7. The method as in claim 1, further comprising:
   receiving, at the device and via a user interface, an indication of the online application for which predictive routing should be enabled.

8. The method as in claim 1, further comprising:
   providing, by the device and to a user interface, data for display regarding the one or more sub-sequences of the state trajectories for the states of the network path.

9. The method as in claim 1, wherein the telemetry data comprises at least one of: delay, loss, or jitter measurements for the network path.

10. The method as in claim 1, wherein the online application is a software-as-a-service (SaaS) application.

11. An apparatus, comprising:
    one or more network interfaces;
    a processor coupled to the one or more network interfaces and configured to execute one or more processes; and
    a memory configured to store a process that is executable by the processor, the process when executed configured to:
      compute states of a network path associated with an online application by representing time series of telemetry data regarding the network path as discrete values;
      generate state trajectories from the states of the network path computed by the apparatus;
      select one or more sub-sequences of the state trajectories based on prediction performance metrics that represent how well the one or more sub-sequences are able to predict a failure condition of the network path; and
      cause a networking entity to use the one or more sub-sequences of the state trajectories to perform predictive routing for the network path.

12. The apparatus as in claim 11, wherein the failure condition of the network path comprises a service level agreement (SLA) violation or decrease in an application experience metric.

13. The apparatus as in claim 11, wherein the networking entity comprises a network router or switch.

14. The apparatus as in claim 11, wherein the prediction performance metrics comprise at least one of: a precision metric, a recall metric, a false positive metric, or a false negative metric.

15. The apparatus as in claim 11, wherein the apparatus selects the one or more sub-sequences of the state trajectories based in part on computational resources available at the networking entity.

16. The apparatus as in claim 11, wherein the process when executed is further configured to:
    receive, from the networking entity, an indication that a prediction made by the networking entity based on the one or more sub-sequences of the state trajectories was a false positive or false negative.

17. The apparatus as in claim 11, wherein the process when executed is further configured to:
    receive, via a user interface, an indication of the online application for which predictive routing should be enabled.

18. The apparatus as in claim 11, wherein the process when executed is further configured to:
    provide, to a user interface, data for display regarding the one or more sub-sequences of the state trajectories for the states of the network path.

19. The apparatus as in claim 11, wherein the telemetry data comprises at least one of:
    delay, loss, or jitter measurements for the network path.

20. A tangible, non-transitory, computer-readable medium storing program instructions that cause a device to execute a process comprising:
- computing, by the device, states of a network path associated with an online application by representing time series of telemetry data regarding the network path as discrete values;
- generating, by the device, state trajectories from the states of the network path computed by the device;
- selecting, by the device, one or more sub-sequences of the state trajectories based on prediction performance metrics that represent how well the one or more sub-sequences are able to predict a failure condition of the network path; and
- causing, by the device, a networking entity to use the one or more sub-sequences of the state trajectories to perform predictive routing for the network path.

* * * * *

UNITED STATES PATENT AND TRADEMARK OFFICE
CERTIFICATE OF CORRECTION

PATENT NO. : 11,811,644 B2
APPLICATION NO. : 17/548985
DATED : November 7, 2023
INVENTOR(S) : Vinay Kumar Kolar et al.

It is certified that error appears in the above-identified patent and that said Letters Patent is hereby corrected as shown below:

In the Specification

Column 1, Line 30 please amend as shown:
can consume considerable resources. In addition, a closed loop Column 9, Line 39 please amend as shown:
in contrast with the notion of an informed decision, Signed and Sealed this
Thirteenth Day of February, 2024

Katherine Kelly Vidal
Director of the United States Patent and Trademark Office